(12) United States Patent
Ni

(10) Patent No.: US 11,422,848 B2
(45) Date of Patent: Aug. 23, 2022

(54) SYSTEMS, METHODS, AND APPARATUSES FOR PROCESSING ROUTINE INTERRUPTION REQUESTS

(71) Applicant: Google LLC, Mountain View, CA (US)

(72) Inventor: Yuzhao Ni, London (GB)

(73) Assignee: GOOGLE LLC, Mountain View, CA (US)

( * ) Notice: Subject to any disclaimer, the term of this patent is extended or adjusted under 35 U.S.C. 154(b) by 442 days.

(21) Appl. No.: 16/337,739

(22) PCT Filed: Jan. 12, 2018

(86) PCT No.: PCT/US2018/013450
§ 371 (c)(1),
(2) Date: Mar. 28, 2019

(87) PCT Pub. No.: WO2019/139604
PCT Pub. Date: Jul. 18, 2019

(65) Prior Publication Data
US 2020/0319917 A1    Oct. 8, 2020

(51) Int. Cl.
*G06F 9/46* (2006.01)
*G06F 9/48* (2006.01)
(Continued)

(52) U.S. Cl.
CPC .......... *G06F 9/4812* (2013.01); *G06F 9/453* (2018.02); *G06F 9/485* (2013.01); *G06F 9/4843* (2013.01); *G06N 5/043* (2013.01); *G10L 15/1815* (2013.01); *G10L 15/22* (2013.01); *G10L 15/30* (2013.01); *H04L 51/02* (2013.01);
(Continued)

(58) Field of Classification Search
CPC ...... G06F 9/4812; G06F 9/453; G06F 9/4843; G06F 9/485
See application file for complete search history.

(56) References Cited

U.S. PATENT DOCUMENTS

2010/0070973 A1   3/2010 Raju et al.
2015/0348551 A1   12/2015 Gruber et al.
2018/0366108 A1*  12/2018 Mukherjee ........ G06F 16/90335

OTHER PUBLICATIONS

International Search Report and Written Opinion of PCT Ser. No. PCT/US2018/013450; 14 pages, dated Oct. 9, 2018.
(Continued)

*Primary Examiner* — Diem K Cao
(74) *Attorney, Agent, or Firm* — Middleton Reutlinger

(57) ABSTRACT

Methods, apparatus, systems, and computer-readable media are provided for allowing an automated assistant routine to be interrupted during performance of the routine. A routine can correspond to a set of actions to be performed at the direction of the automated assistant. When the routine is initialized and a user subsequently issues a command to interrupt the routine, the automated assistant can modify a status identifier for the routine. That status identifier can be stored at a database and allow other applications and/or devices that are operating to complete the routine to be put on notice that the user has requested the routine be interrupted. The database can be accessible to one or more devices and/or applications, such as third party applications, in order to provide a medium through which the devices and/or applications can check the statuses of various automated assistant routines.

17 Claims, 6 Drawing Sheets

(51) Int. Cl.
   *G06F 9/451*    (2018.01)
   *G06N 5/04*     (2006.01)
   *G10L 15/18*    (2013.01)
   *G10L 15/22*    (2006.01)
   *G10L 15/30*    (2013.01)
   *H04L 51/02*    (2022.01)
   *G06N 20/00*    (2019.01)
   *G16Y 10/75*    (2020.01)

(52) U.S. Cl.
   CPC ........ *G06N 20/00* (2019.01); *G10L 2015/223* (2013.01); *G16Y 10/75* (2020.01)

(56) References Cited

OTHER PUBLICATIONS

European Patent Office; Summons issued in Application No. 18702594.5; 14 pages; dated Aug. 9, 2021.
European Patent Office; Result of Consultation issued in Application No. 18702594.5, 15 pages, dated Feb. 25, 2022.
European Patent Office; Provision of the minutes in accordance with Rule 124(4) issued in Application No. 18702594.5, 15 pages, dated Mar. 29, 2022.
European Patent Office; Summons to Attend Oral Proceedings pursuant to Rule 115(1) issued in Application No. 18702594.5, 29 pages, dated May 16, 2022.

* cited by examiner

SYSTEMS, METHODS, AND APPARATUSES FOR PROCESSING ROUTINE INTERRUPTION REQUESTS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. Some automated assistants can perform multiple actions in response to a command, thereby causing an automated assistant to undertake a routine in response to receiving a particular spoken command. Unfortunately, a user may not be able to stop a routine once an automated assistant has already begun directing performance of actions involved in the routine. This can be problematic in situations when a user is attempting to cause the automated assistant to perform another action or routine while a current routine is being executed. As a result, there will necessarily be a delay before the automated assistant can start another action or routine. Furthermore, any processing resources and power expended on performing the initial routine would be wasted.

SUMMARY

The present disclosure is generally directed to methods, apparatus, and computer-readable media (transitory and non-transitory) for allowing a user to interrupt a routine that is being performed by an automated assistant in order to conserve computational resources that would otherwise be wasted performing a routine that is no longer of interest to a user. An automated assistant can be pre-configured, or configurable by one or more users, to perform a routine that includes a set of actions to be performed at the direction of the automated assistant. For example, the automated assistant can perform a set of actions associated with a typical morning routine of the user in response to the user providing a spoken command such as, "Assistant, please perform my morning routine." The set of action corresponding to the "morning routine" can include: turning on an internet of things (IOT) device for providing an audible news report, turning on lights in a home, and causing a tablet device to display a schedule for the day. In order to stop the routine, the architecture through which the routine is executed can be modified to handle commands for interrupting routines.

The system for allowing an automated assistant to perform routines can include a routine management engine and a state management engine, each in communication with a database that can include status information for each routine. The routine management engine can identify routines that are being performed by the automated assistant, in order that the database can be updated to reflect a status of each routine. The system can also include a state management engine. The state management engine can process requests to modify a routine being performed by the automated assistant and can update the database to indicate whether a routine is the subject of a request from the user. Any applications involved with a particular routine can be tasked with checking the database for updates to determine whether the routine has been modified.

For example, a user can provide a command to the automated assistant for performing the "morning routine." The automated assistant can cause the routine management engine to write and/or modify one or more entries in the database to indicate that the routine has been initialized. Because the automated assistant can operate as one or more applications or scripts executing at one or more devices, each application or script can be tasked with checking the database to determine whether the routine has been modified. In some implementations, when a routine includes third party applications or devices, a third party application or device can also be tasked with checking the database for changes to the routine. For instance, after the user has initially provided the initiating command, "Assistant, please start my morning routine," the user can provide a command for stopping the routine, such as, "Assistant, stop." Because the user has not provided any description of what should be stopped, the automated assistant can cause a search to be performed to identify a candidate routine to be stopped.

In order to identify a candidate routine, the automated assistant can cause a state management engine to access the database to identify routines that are being performed by the automated assistant. The automated assistant can use contextual data to determine the candidate routine that will be modified. For example, the automated assistant can determine whether a user that provided the stop command corresponds to a user that initialized the routines identified by the state management engine. In this way, the automated assistant can ensure that the routine being modified is a routine that was previously initialized by the user who provided the stop command.

In some implementations, contextual data can include data that is generated by the automated assistant, an application that is accessible to the automated assistant, one or more devices that are accessible to the automated assistant, and/or any other application or device that can collect contextual data. Contextual data can include data that identifies the user, a time associated with a command, a location at which the user is providing the command, a device to which the user is providing the command, a schedule of the user, other users that are associated with the user who provided the command, and/or any other information that can be used to identify a context in which the user is interacting with an automated assistant. For example, a routine that is identified at the database and was previously initialized by the user can be selected as the candidate routine, at least based on a correlation between a name of the user that provided the stop command and a name of the user that initialized the routine. Alternatively, or additionally, a routine that is identified at the database and was previously initialized at a device that also received the stop command can be selected as the candidate routine.

The state management engine can generate a state management request based on the identified candidate routine. The state management request can be provided to the database in order to provide an indication that the user has requested the candidate routine be stopped. In some implementations, in response to the database receiving the state management request, a status identifier associated with the candidate routine can be modified by the state management request to indicate that the candidate routine has been stopped. In this way, when the automated assistant and/or any other application that has been tasked with checking the database accesses the database, the candidate routine will be associated with a status identifier that indicates the routine has been stopped. In response, the automated assistant and/or other application that is operating in association with the candidate routine, will cease performing actions associated with the candidate routine.

In some implementations, a routine can be performed by one or more devices and/or one or more applications. For example, a routine can be performed at the direction of an automated assistant, but the actions associated with the routine can be performed by a variety of different applications and/or different devices. A routine that includes an action of ordering a ride to a destination can involve the automated assistant accessing or invoking a third party application that can order a driver to drive to a location of the user and drive the user to a destination. The third party application can be tasked with accessing the database to check a status of the routine periodically. If the user elects to stop the routine by issuing a stop command to the automated assistant, the third party application can acknowledge the stop command by accessing the database. In response to determining that the user has issued a stop command for the routine, the third party application can cancel an action being performed by the third party application, reverse any changes made by the third party application, and/or otherwise perform any tasks necessary for stopping completion of their portion of the routine.

A user can modify a routine when the automated assistant is directing the performance of the routine in a variety of different ways. For example, the user can issue a stop command for stopping the routine. The user can also issue a pause command for pausing the routine. In this way, the user can subsequently resume a paused routine by issuing a resume command to the automated assistant. In some implementations, the user can issue a rewind command for reversing one or more actions that have been performed at the direction of the automated assistant during the routine. For example, when a routine includes modifying settings of IOT device within a home of the user and the user issues a rewind command during the routine, the settings of the IOT devices can be reverted back to previous settings before the routine was initialized. In this way, the user does not need to wait until the routine is completed before reversing the settings. This can save computational resources and/or power at the affected devices, especially when the settings being modified correspond to processes that would increase power consumption at the affected devices. For instance, if a setting includes modifying a temperature of the home, any appliances involved in changing the temperature of the home can have their settings reverted more quickly than if the routine was left to completion, thereby saving energy that would otherwise be exerted to complete the routine. In general, by allowing the user to interrupt the routine, network and computational resources can be preserved, at least because the actions being performed in furtherance of the routine can be stopped at any time.

In some implementations, a method performed by one or more processors is provided that includes: receiving, at an automated assistant interface, a routine command corresponding to a request for an automated assistant application to initiate performance of a routine that includes a set of actions to be performed at the direction of the automated assistant application; providing a first routine write request to a database in response to receiving the routine command, wherein the first routine write request is configured to cause a routine state identifier at the database to indicate that the routine is in progress; receiving, at the automated assistant interface, an interrupt request from a user; providing a second routine write request to the database in response to receiving the interrupt request from the user, the second routine write request configured to modify the routine state identifier to indicate that the routine is at least temporarily interrupted; and, when the routine state identifier is modified at the database in response to the database receiving the second routine write request: causing one or more actions of the set of actions of the routine to be at least temporarily interrupted.

In other implementations, a method performed by one or more processors is provided that includes: receiving, from an automated assistant application, a routine write request in response to the automated assistant application receiving an input command from a user, the routine write request identifying a routine that corresponds to a set of actions to be initiated by the automated assistant application in response to receiving the input command; generating a routine state for the routine in response to receiving the routine write request, wherein the routine state is associated with an identifier for the routine and is configured to be modifiable during the routine; receiving a state read request from the automated assistant application, wherein the state read request is received during performance of the routine and in response to the automated assistant application receiving a routine interrupt request from the user; identifying, in response to receiving the state read request, the identifier for the routine that is being performed by the automated assistant application; providing, to the automated assistant application, the identifier for the routine being performed by the automated assistant application; receiving, from the automated assistant application, a state write request configured to at least temporarily interrupt the routine being performed; modifying the routine state in response to receiving the state write request; and providing the modified routine state in response to a next routine state request, wherein providing the modified routine state causes the routine to be at least temporarily interrupted.

In yet other implementations a method performed by one or more processors is provided that includes: receiving a request to perform an action that is associated with a set of actions in a routine that is employed by an automated assistant application, wherein the request is received at a computing device in response to an input command being received at an automated assistant interface; initiating the action in response to receiving the request to perform the action; providing a write request to a database that is accessible to the automated assistant application, wherein the write request is configured to provide an indication to the database that the action is in progress; causing a read request to be provided to the database, the read request configured to determine a status identifier for the routine, wherein the status identifier is configured to be modifiable during the routine; determining, based on the read request, that the status identifier for the routine has been modified in response to the automated assistant application receiving an interrupt request; and when the action is in progress: at least temporarily interrupting the action in response to determining that the status identifier for the routine has been modified.

By enabling the routine to be at least temporarily interrupted, these and other methods are able to prevent the expenditure of at least those computational and network resources used in furtherance of the routine. In this way, power consumption efficiency can be improved by the corresponding reduction in resource usage. For example, where the routine comprises one or more outputs, e.g. audio or visual outputs, the interruption or termination of the routine can prevent the unnecessary expenditure of power required for such outputs. Similarly, where the routine comprises a network communication, e.g. the transmission of a query or instruction to a remote device, the interruption or termination of the routine can prevent the unnecessary expenditure of power required for such communication. In each case, processing resources required for computation, determination and control of the routine outputs can be preserved, as well as the associated processor power consumption. The interruption or termination of the routine may further preserve those computational and network resources that would be used to reserve the actions taken by routine, if the routine was allowed to be completed. This may include resources for processing at least one further user input instructing the reversal of the routine, and may include resources for processing a plurality of user inputs for individually reversing a plurality of actions performed by the routine.

These and other implementations of technology disclosed herein may optionally include one or more of the following features. In some implementations, providing the second routine write request to the database can include selecting the routine state identifier from other identifiers stored at the database, the other identifiers corresponding to different routines capable of being performed by the automated assistant application. In some implementations, modifying the routine state identifier can include generating a value for the routine state identifier that indicates at least one action of the set of actions has been stopped. In some implementations, the set of actions includes a third party action that is associated with a third party application. In some implementations, when the third party action has been completed prior to receiving the interrupt request: the routine state identifier can be modified to indicate that the third party action is completed. In some implementations, a method can include providing, to the user, a notification indicating that the routine has been stopped and the third party action has been completed. In some implementations, the automated assistant interface can be integral to a computing device, and the routine state identifier can be stored at the database that is provided at a separate computing device.

In some implementations, a method can include generating contextual data in response to receiving the routine command; and identifying, in response to receiving the interrupt request, the routine state identifier based on the contextual data. In some implementations, identifying the identifier for the routine can include performing a query to select the identifier from other identifiers stored at a database, wherein the other identifiers can correspond to different routines capable of being performed by the automated assistant application. In some implementations, modifying the routine state can include: generating a value for the routine state that indicates at least one action of the set of actions has been stopped. In some implementations, the set of actions can include a third party action that is associated with a third party application. In some implementations, a method can include, when the third party action has been completed prior to receiving the state write request: modifying the routine state to indicate that the third party action is completed.

In some implementations, a method can include causing the automated assistant application to provide, to the user, a notification indicating that the routine has been stopped and the third party action has been completed. In some implementations, the routine interrupt request can be received at an automated assistant interface of a computing device, and the routine state can be stored at a database that is provided at a separate computing device. In some implementations, identifying the identifier for the routine can be performed based on contextual data that is available to the automated assistant application. In some implementations, the action can be a third party action that is associated with a third party application. In some implementations, a method can include, when the third party action has been completed prior to the automated assistant application receiving the interrupt request, causing the status identifier to be modified to indicate that the third party action is completed. In some implementations, a method can include causing the automated assistant application to provide, to a user, a notification indicating that the third party action has been completed. In some implementations, causing the read request to be provided to the database can include providing multiple read requests to the database during performance of the action. In some implementations, a method can include, when the action has been completed and the status identifier for the routine indicates that the routine has been reversed, causing a separate action to be performed to undo the action. In some implementations, a method can include determining that the status identifier for the routine has been modified to indicate that the routine is to continue; and causing the action to be completed.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
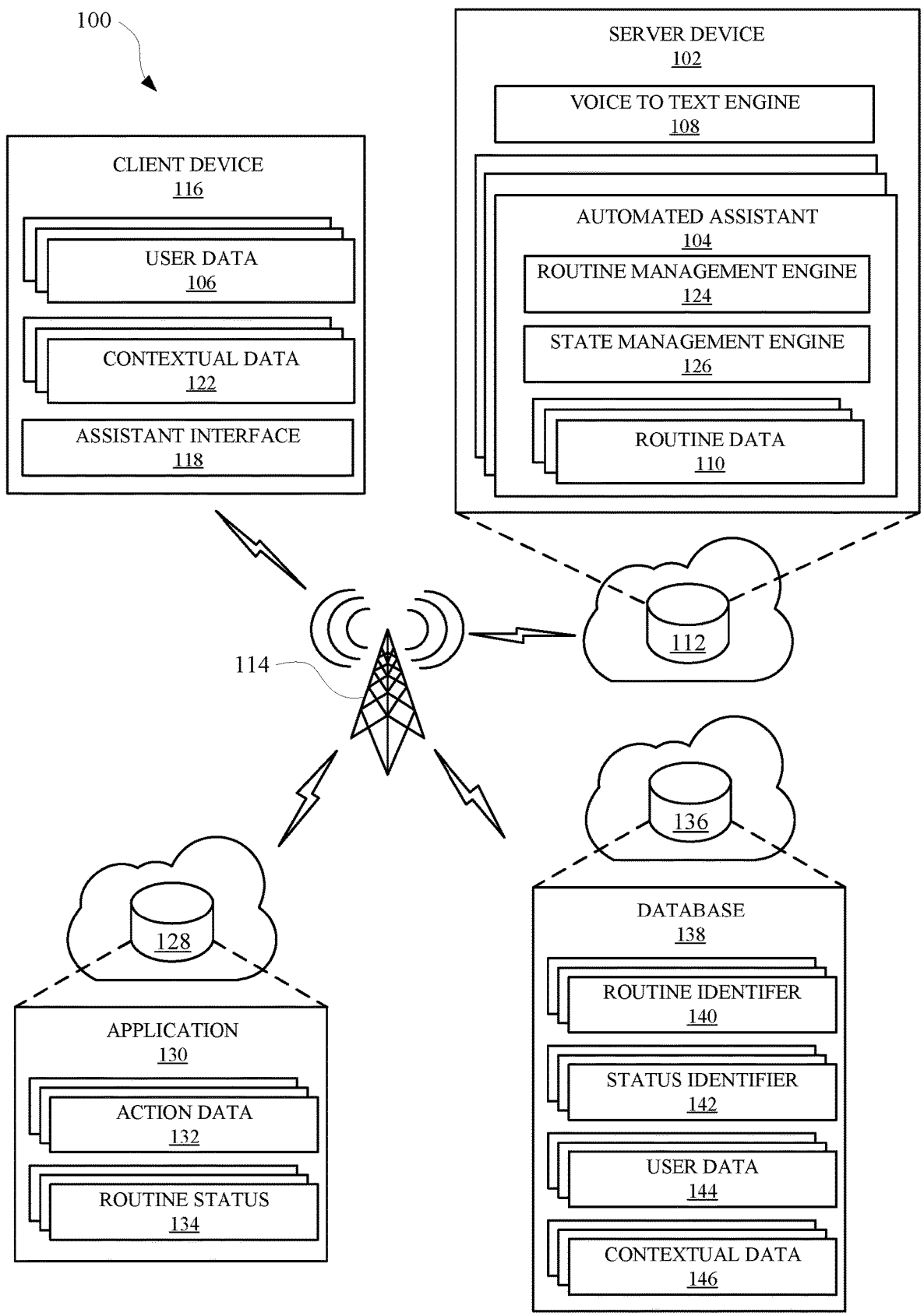
FIG. 1 illustrates a system for allowing a user to initialize and interrupt routines performed at the direction of an automated assistant.

FIG. 1 illustrates a system 100 for allowing a user to initialize and interrupt routines performed at the direction of an automated assistant 104. The system 100 can include a remote device 112, such as a server device 102, which can host an automated assistant 104. In some implementations, the automated assistant 104 can be hosted at the server device 102, and/or one or more computing devices capable of hosting an assistant application. For example, in some implementations, the automated assistant 104 can be hosted at a client device 116 and/or the server device 102. Processes and/or functions performed by the automated assistant 104 can be performed by the server device 102, or distributed over separate devices. For instance, a user can provide an input, such as a voice command or a textual input, at an assistant interface 118 of the client device 116. The input from the user can be transmitted from the client device 116, over a network 114, such as a private network (e.g., peer-to-peer), or a public network (e.g., the internet), to the server device 102. When the input is a voice command, or other audible input from the user, the input can be received at a voice to text engine 108, which can be part of the automated assistant 104 or separate from the automated assistant 104. The voice to text engine 108 can convert the input into text, which can be parsed by the automated assistant 104 to determine how the automated assistant 104 can sufficiently respond to the input from the user.

The automated assistant 104 can employ one or more machine learning algorithms for learning or otherwise adapting to user requests, preferences, and/or how the user otherwise interacts with the automated assistant 104. Interactions between one or more users and the automated assistant 104 can be stored as routine data 110, user data 106, and/or contextual data 122, which can each be stored at the server device 102 and/or the client device 116. The routine data 110 can, for example, provide correspondence data that identifies one or more inputs received from one or more users and one or more routines to be performed by the automated assistant 104. A routine can correspond to a set of actions to be performed by the automated assistant 104, a separate application(s), a separate device from the server device 102, and/or any other application and/or device capable of interacting with the automated assistant 104.

A routine can be performed at the direction of the automated assistant 104 and can be controlled by one or more users during performance of the routine. A status of a routine can be stored at a remote device 136, which can include a database 138. The database 138 can include routine identifiers 140, status identifiers 142, user data 144, and/or contextual data 146. Initially, when a user requests that a routine be initialized, a command can be received by the assistant interface 118. Optionally, the client device 116 can generate and/or store user data 106 and/or contextual data 122, which can be associated with the command for initializing the routine. The automated assistant 104 can acknowledge the command being received at the assistant interface 118 and generate routine data 110 for the routine. In some implementations, the automated assistant 104 can receive the command from the user and perform a query to identify a routine that corresponds to the command. Thereafter, when the routine has been identified, the automated assistant can cause a routine management engine 124 to access the database 138 and modify a status identifier 142 associated with the routine to indicate that the routine is active.

When the user initializes a routine at the assistant interface 118, the automated assistant can identify a set of actions associated with the routine and delegate each action of the set of actions accordingly. For example, at least one action in the set of actions can be performed by an application 130 that is hosted at a separate computing device 128. Therefore, the automated assistant 104 can communicate with the application 130 to cause the application 130 begin performing the action. The automated assistant 104 can optionally task the application 130 to access the database 138 one or more times (e.g., periodically) during the performance of the action to determine whether a status identifier 142 associated with the routine has been modified. In some implementations, the application 130 can store a routine status 134 and update the routine status 134 when the status identifier 142 stored at the database 138 has been modified. If the routine status 134 changes during performance of the action, any action data 132 associated with the action being performed by the application 130 can be modified according to the change in the routine status 134. For example, if the application 130 has been tasked with performing an action such as changing the settings of an appliance in a home of the user, the action data 132 can correspond to the changed settings of the application. If the user issues a command to stop the routine associated with the action, the action data 132 can be modified to revert back to the settings that the appliance had before the action was initiated or before the routine was initialized.

When a user attempts to stop a routine after the routine has been initialized by the automated assistant 104, the command for stopping the routine may not explicitly identify the routine. Therefore, in order to identify the routine to which the user is referring, the automated assistant 104 can use the user data 106 and/or the contextual data 122 to identify a candidate routine that will be stopped in response to the command from the user. For example, when a user initializes a routine, user data 106, and/or contextual data 122 can be collected at the client device 116 and provided to the server device 102 and/or the remote device 136. As a result, the database 138 can identify multiple routines as well as any user data 144 and/or contextual data 146 that can be associated with each routine of the multiple routines. When a user provides an interrupt command at the assistant interface 118, the automated assistant 104 can receive the interrupt command and cause the routine management engine 124 to identify the candidate routine.

The candidate routine can be identified based on the interrupt command, the user data 144 associated with each routine, the contextual data 146 associated with each routine, and/or any other data that can be associated with a routine. For example, the contextual data 146 can identify timestamps associated with the routines, and therefore the candidate routine can be a most recent routine that was initialized by the automated assistant 104. Alternatively, the contextual data 146 can identify devices and/or locations at which a routine was initialized, and compare the devices and/or locations to a most recent device and/or location that the user provided the interrupt command. Therefore, the candidate routine that will be interrupted or otherwise modified by the interrupt command can be a routine that was initialized at the same device and/or the same location that the user provided the interrupt command. For instance, if the user initialized the routine at a cellular device, and thereafter provided the interrupt command at the same cellular device, the contextual data 146 will provide a correspondence between the cellular device and the routine. The correspondence can then be identified by the routine management engine 124, which can select the routine as the candidate routine to be modified by the interrupt command.

When the candidate routine has been identified, a state management engine 126 and/or the automated assistant 104 can provide a write request to the database 138 in order to modify the status identifier 142 associated with candidate routine. The state management engine 126 can, for example, modify the status identifier 142 associated with the candidate routine to indicate that the routine has been stopped. As a result, any application and/or device that has been tasked with performing an action in furtherance of the routine can acknowledge that the routine has been stopped at the direction of the user. In some implementations, the user can provide an interrupt command to the assistant interface 118 to cause a status of the routine to be modified in a variety of different ways. For example, the user can provide an interrupt command to rewind the routine, pause the routine, stop the routine, delay the routine until a certain condition has been met, and/or change any other aspect of the routine.

In some implementations, a user can provide an interrupt command that delays a routine until certain conditions have been met. The conditions can be specified by the user in the interrupt command. For instance, the user can provide on initial command to initialize a routine such as, "Assistant, please start my home routine," when the user is leaving their office. In response, the automated assistant 104 can delegate the actions for the "home routine." Thereafter, the user can have another commitment that prevents them from going home at the time they expected to go home. In order to stop the routine that was initialized by the user, at least until the user gets home, the user can provide an interrupt command such as, "Assistant, please delay the routine until I get home." In response, the routine management engine 124 can identify the routine that the user is referring to and modify the status identifier 142 associated with the routine to indicate that the routine has been delayed until the user arrives home (e.g., "Status_Identifier=home_routine.delay-until_location:home").

Contextual data 146 associated with the routine can identify the location of the user as being at their office. When the user arrives home, the automated assistant 104 can update the contextual data 146 and modify a stored location of the user to indicate that the user is at home. The state management engine 126 can acknowledge that the user has arrived home and modify the status identifier 142 to indicate that the routine is active. In response, any application and/or device that has been delegated an action in furtherance of the routine can continue performing their delegated action in response to the status identifier 142 changing from delayed to active. In this way, the user does not have to repeat the initial command (e.g., "Assistant, start the home routine") to the automated assistant 104 to start the routine when they get home. This can save computational resources because the voice command audio does not have to be re-processed, and the actions do not have to be re-delegated to each of the applications and/or devices involved in performing the routine.

Figure 2:
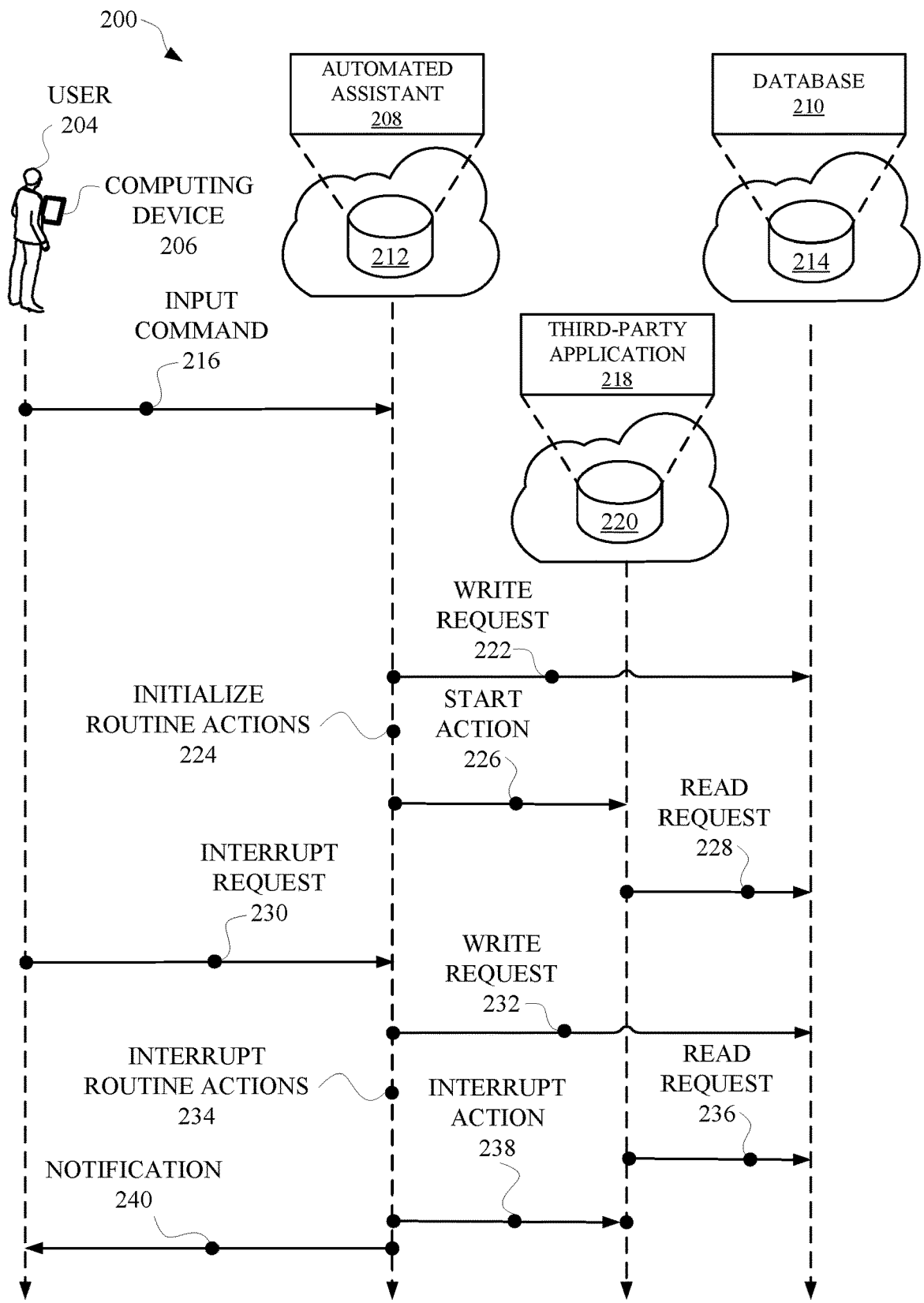
FIG. 2 provides a state diagram that illustrates how a routine performed by an automated assistant can be interrupted by a user, thereby causing various actions of the routine to be interrupted.

FIG. 2 provides a state diagram 200 that illustrates how a routine performed by an automated assistant 208 can be interrupted by a user 204, thereby causing various actions of the routine to be interrupted. Initially, a user 204 can provide an input command 216 to an automated assistant 208, which can be hosted at one or more computing devices 212. The input command 216 can correspond to a natural language input at an automated assistant interface, which can be connected to, or be in communication with, the computing device 212. Furthermore, the input command 216 can correspond to a request for the automated assistant 208 to perform a routine that includes a set of actions. The routine can be pre-configured at the automated assistant 208, such as by the user 204 or a manufacturer of the automated assistant 208. In response to receiving the input command 216, the automated assistant 208 can provide a write request 222 to a separate computing device 214. The computing device 214 can host a database 210, which can be accessible to the automated assistant 208, and/or any other application and/or device that can be tasked with performing an action in furtherance of completing the routine. For example, a third party application 218, which can be hosted at a computing device 220, can access the database 210 while performing an action assigned to the third party application 218 by the automated assistant 208. The term "third party" can refer to an entity that is different than an entity that initially manufactured and/or configured the automated assistant 208.

In response to receiving the input command 216, the automated assistant 208 can initialize routine actions 224. The actions can correspond to the routine identified by the input command 216 and/or identified by the automated assistant 208. When the automated assistant 208 initializes the routine actions 224, the automated assistant 208 can also provide a write request 222 to the database 210. The write request 222 can cause an entry to be provided at the database 210 identifying the routine that has been initialized at the automated assistant 208. In some implementations, the write request 222 can modify a status of a routine provided at the database 210 to indicate that the routine is now in progress. When the routine includes an action to be performed by the third party application 218, the automated assistant 208 can provide a start action command 226 to the third party application 218. In some implementations, by providing the start action command 226, the automated assistant 208 can task the third party application 218 to check a status of the routine as the third party application 218 is performing the action assigned to it. For example, as the third party application 218 is performing the action, the third party application 218 can provide a read request 228 to the database 210. In response to the read request 228, the third party application 218 can identify a status of the routine. At the point of the state diagram 200 when the read request 228 is provided to the database 210, the status of the routine can be indicated as "active."

While the third party 218 is performing the action and the automated assistant 208 is directing performance of the routine, the user 204 can provide an interrupt request 230 to the automated assistant 208. The interrupt request 230 can be a command to stop the routine, pause the routine, rewind the routine, delay the routine until a specific time or until a condition is met, and/or any other command that can interrupt a routine. In response to receiving the interrupt request 230, the automated assistant 208 can provide a write request 232 to the database 210. The write request 232 can cause a status of the routine stored at the database 210 to change from "active" to "stopped," or any other status identifier that corresponds to the interrupt request 230. Furthermore, in response to receiving the interrupt request 230, the automated assistant 208 can interrupt routine actions 234 in order to stop further performance of the actions by the automated assistant 208 and/or any other application or device that has been tasked with performing an action.

Because the third party application 218 has been tasked with checking the database 210 for changes to the status of the routine, the third party application 218 can provide a read request 236 to the database 210 during performance of the action. As a result, the third party application 218 will be put on notice that the status of the routine has been modified from active to a different status, such as "stopped." In response to determining that the status of the routine has been changed, the third party application 218 can interrupt its action 238 until further instruction is received by the automated assistant 208, and/or the status of the routine has changed at the database 210. Optionally, the automated assistant 208 can provide a notification 240 to the user indicating that the status of the routine has changed and therefore actions being performed in furtherance of the routine have been interrupted pursuant to the interrupt request 230. For example, if the user 204 provided a request to stop the routine, the notification 240 can acknowledge that the status of the routine has changed to "stopped."

Figure 3:
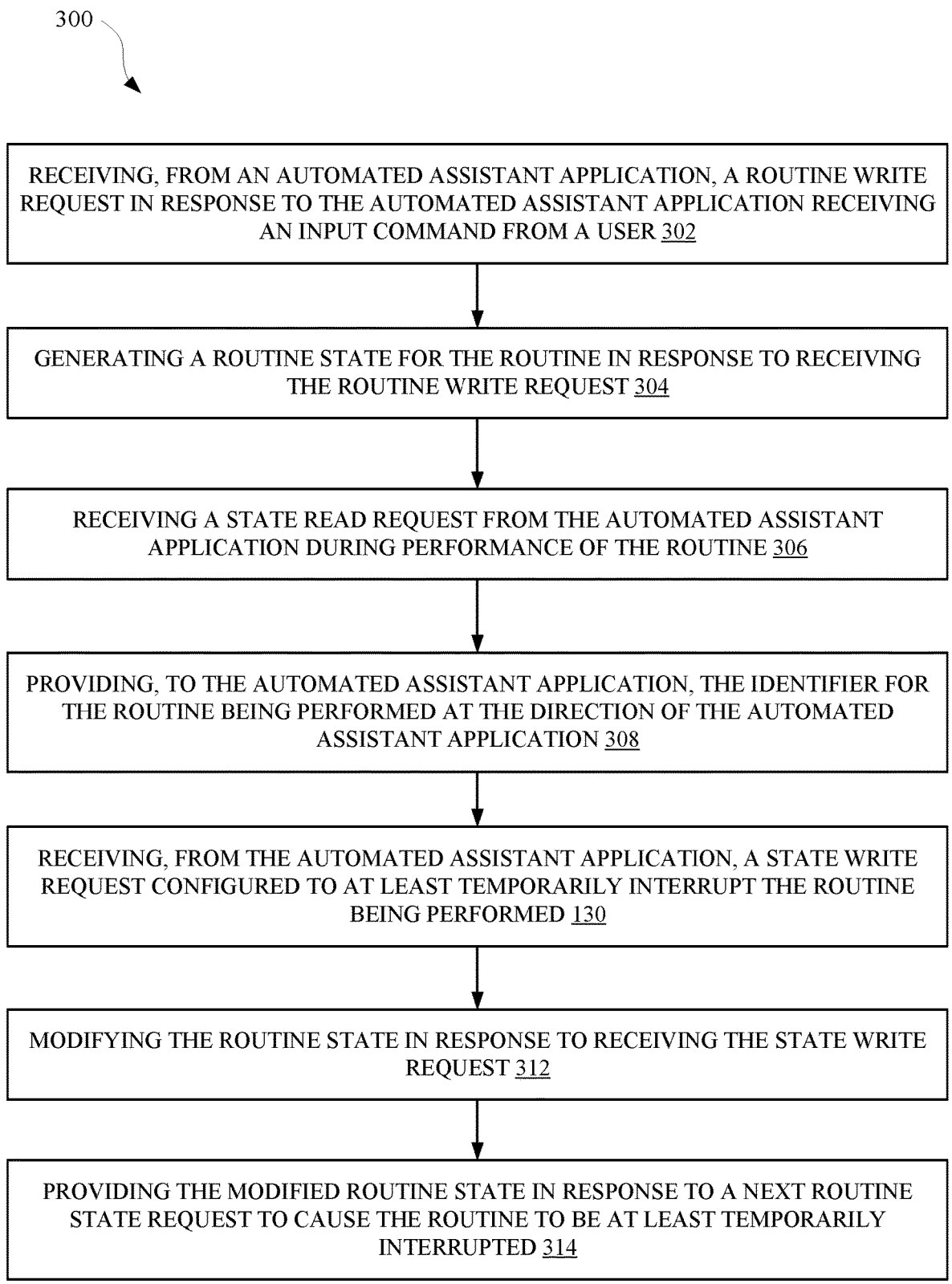
FIG. 3 illustrates a method for managing a database that is accessible to an automated assistant in order to allow a routine performed by the automated assistant to be modified during execution of the routine.

FIG. 3 illustrates a method 300 for managing a database that is accessible to an automated assistant in order to allow a routine performed by the automated assistant to be modified during execution of the routine. The method 300 can be performed by one or more applications and/or devices that are capable of interacting with and/or hosting a database. The method 300 can include an operation 302 of receiving a routine write request in response to an automated assistant receiving on input command from a user. The routine write request can identify a routine that includes a set of actions to be performed at the direction of the automated assistant. The input command can be a natural language input that is provided to an automated assistant interface of a computing device. The automated assistant interface can be, for example, a microphone, a camera, a touch display, a peripheral device, and/or any other interface that can be used to communicate with a device application. In some implementations, the input command can be a spoken natural language input corresponding to a routine for preparing a user for a flight. For example, the user can provide an input command such as, "Assistant, please prepare for my flight." The input command can correspond to a routine that includes a set of actions, which can include actions such as setting a thermostat in the home of the user, downloading a podcast for the user to listen to during the flight, and ordering a ride to the airport. The thermostat can be controlled by the automated assistant, the downloading of the podcast can be performed through a third party application, and the ordering of the ride can also be performed through a third party application. Therefore, in order to perform the routine, the automated assistant will interact with other applications and devices. Additionally, the automated assistant can task each of the applications and devices involved with the routine to check a database for updates to a status of the routine.

The method 300 can also include an operation 304 of generating a routine state for the routine in response to receiving the routine write request. The routine state can be associated with an identifier for the routine and can be configured to be modifiable during the routine. For example, the routine identifier can be "flight routine," at least based on the name of the routine initialized by the user via the input command to the automated assistant interface. In some implementations, the routine identifier can be stored at the database in association with the routine state, which can identify a status of the routine and/or one or more actions of a set of actions corresponding to the routine. For instance, the routine state can be "active" or "in progress" when the routine is initially initialized by the user.

The method 300 further include an operation 306 of receiving a state read request from the automated assistant and/or a state management engine. The state read request can be received during performance of the routine, and can be received in response to the automated assistant receiving a routine interrupt request from the user. The state read request can be received at the database in order for the automated assistant, and/or any other application or device associated with the routine, to identify the routines that are in progress or otherwise being performed at the direction of the automated assistant. The routine interrupt request can correspond to a spoken natural language input received at the automated assistant interface. The routine interrupt request can be for example, "Assistant, stop preparing for my flight." In order to identify the routine to which the user is referring, the automated assistant can cause the state read request to be provided to the database. In some implementations, the state read request can be generated by a state management engine, which can be accessible to the automated assistant and/or any other application or device that can be associated with a routine. For example, the automated assistant can convert the routine interrupt request from voice to text, and provide a command corresponding to the text to the state management engine. In response, the state management engine can provide a request to the database to identify routines that are in progress.

The method 300 can also include an operation 306 of identifying, in response to receiving the state routine request, the identifier for the routine that is being performed at the direction of the automated assistant. For example, the state management engine can generate the state routine request to identify routines that are associated with a term "flight." If the flight routine is the only routine associated with the term "flight," the state management engine will be able to quickly identify the flight routine at the database. However, if there are multiple routines associated with the term "flight," the state management engine can filter the routines using contextual data. In this way, the state management engine can rank the pending routines according to their similarities to the contextual data and identify a routine that is a closest match to the routine that the user is intending to modify or stop.

The method 300 can further include an operation 308 of providing, to the automated assistant, the identifier for the routine being performed by the automated assistant. The identifier can include one or more identifiers that allow the automated assistant to determine a name of the routine, a status of the routine, and/or any other information that can be associated with a routine being performed by an automated assistant. Providing the identifier can include allowing the identifier to be accessed at the database.

The method 300 can also include an operation 310 of receiving, from the automated assistant and/or a state management engine, a state write request configured to at least temporarily cause an interruption to the routine being performed at the direction of the automated assistant. For example, the state write request can include instructions for modifying the state of the routine. If the user has provided a routine interrupt request for stopping the routine, the state write request can be configured to modify the state of the routine to indicate that the routine is stopped or has been instructed to be stopped.

The method 300 can further include an operation 312 of modifying the status of the routine in response to receiving the state write request. The status of the routine can be modified from "active" to "stopped." In this way, any application or device that has been tasked with accessing the database to determine the status of the routine will be able to acknowledge that the routine has been stopped or has been instructed to be stopped. This can conserve computational resources that would otherwise be wasted if the user was not able to stop the routine while it is in progress.

The method 300 can also include an operation 314 of providing the modified routine state in response to a next routine state request. The routine state request can be provided by the automated assistant, an application, a device, and/or any other device or application that can be associated with the routine. For example, the routine state request can be provided by a third party application that has been tasked with booking a ride for the user from their home to the airport. When the third party application receives or identifies the modified routine state, the third party application can stop the activity that they are performing in furtherance of the routine. For instance, if the third party application was attempting to contact drivers, the third party application can cease providing queries to remote devices associated with the drivers. Alternatively, if the routine state request was provided by an IOT device that can modify a temperature of the home of the user, the IOT device can revert to a previous temperature in response to acknowledging the modified routine state.

Figure 4:
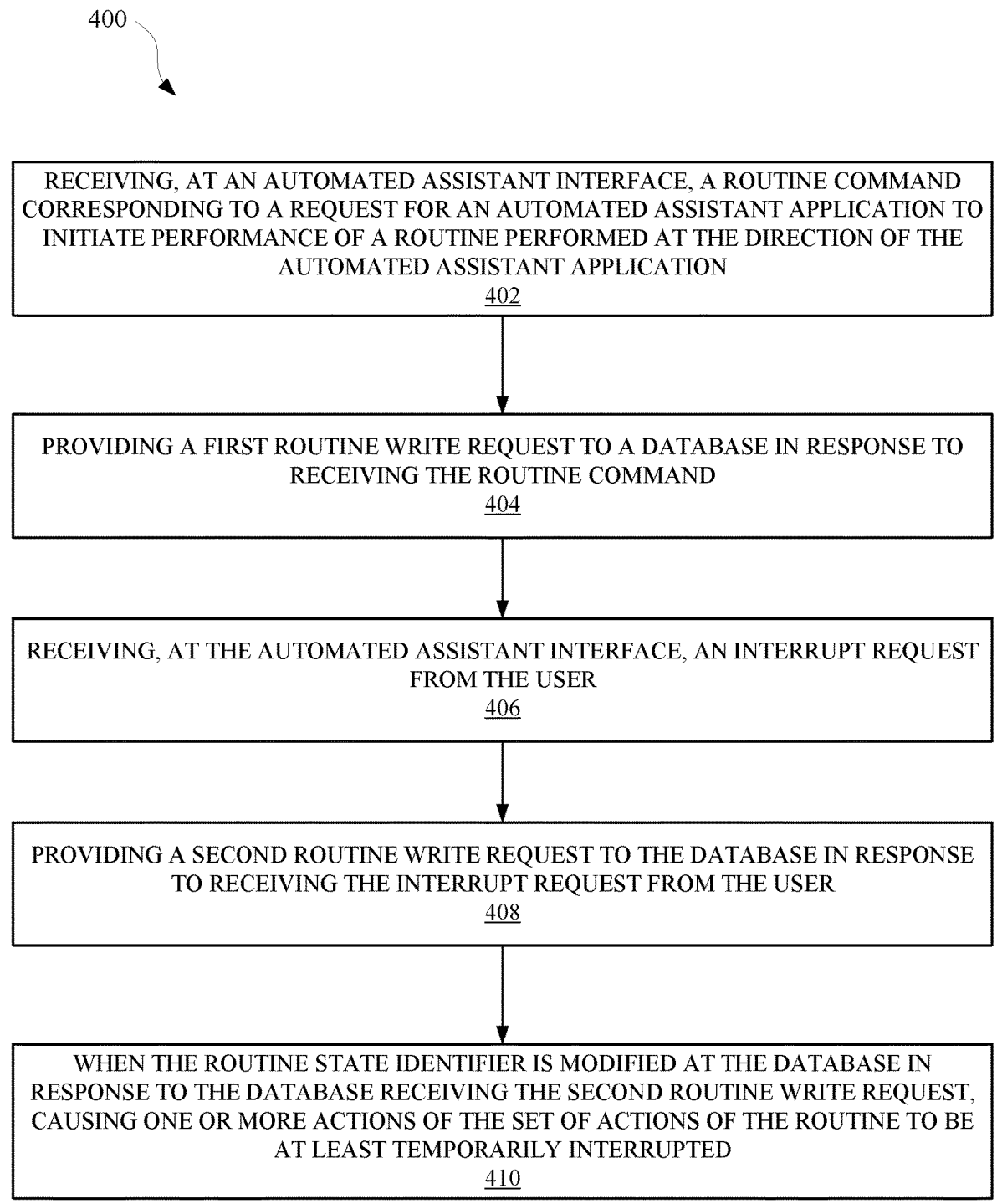
FIG. 4 illustrates a method for controlling an automated assistant to at least temporarily interrupt a routine being performed the automated assistant.

FIG. 4 illustrates a method 400 for controlling an automated assistant to at least temporarily interrupt a routine being performed the automated assistant. The method 400 can be performed by one or more applications or computing devices capable of interacting with or providing an automated assistant. The method 400 can include an operation 402 of receiving, at an automated assistant interface, a routine command corresponding to a request for an automated assistant application to initiate performance of a routine. The routine can be performed at the direction of the automated assistant and include a set of actions to be performed by the automated assistant, one or more applications, and/or one or more computing devices. The automated assistant interface can be a device and/or application that is connected to a computing device with which the user is operating. For example, the automated assistant interface can include a microphone, a touch display, a peripheral device, a camera, and/or any other apparatus with which a user can control an application or device. In some implementations, the routine command received at the automated assistant interface can be "Assistant, please prepare for a party." The aforementioned routine command can correspond to a set of actions that include modifying lighting settings in a home, playing a party playlist, and setting a reminder to put on a movie. The set of actions can include causing one or more applications and/or devices to perform the actions of the set of actions.

The method 400 can further include an operation 404 of providing a first routine write request to a database in response to receiving the routine command. The first routine write request can be provided by the automated assistant and/or a routine management engine that is associated with the automated assistant. The first routine write request can be provided to the database in order to provide a record or identifier for the routine that was requested by the user to be performed at the direction of the automated assistant. For example, when the user requested the automated assistant to perform the "party routine," the first routine write request can be configured to cause an entry identifying the "party routine" to be created at the database. In some implementations, a routine state or status can also be created at the database in response to the database receiving the first write request. The routine state can be, for example, "in progress," "active," and/or any other identifier that can be used to describe a status of a routine.

The method 400 can also include an operation 406 of receiving, at the automated assistant interface, an interrupt request from the user. The interrupt request can correspond to a spoken natural language input provided to the automated assistant interface. For example, the interrupt request can correspond to a spoken command such as, "Assistant, go back" or "Assistant, rewind." The aforementioned commands can cause the automated assistant to reverse any of actions in the set of actions that have already been performed in furtherance of the routine, rather than stopping the routine. In this way, the user is able to not only stop the continuation of the routine, but also revert particular applications and devices back to their operating settings before the routine was initialized.

The method 400 can additionally include an operation 408 of providing a second routine write request to the database in response to receiving the interrupt request from the user. The second write request can be configured to modify the routine state identifier to indicate that the routine is at least temporarily interrupted. The second write request can correspond to a spoken command from the user and cause the database to include an entry that identifies a status of the routine. For example, the second write request can cause a status identifier corresponding to the routine to be changed from "active" to "rewind" or "revert," or any other identifier indicating that the routine has been reversed. In this way, any application and/or device that has been tasked with checking the status of the routine during the routine can acknowledge the change in status of the routine. The change in status can cause an application and/or device responsible for performing an action of the routine to reverse any completed actions.

The method 400 can further include an operation 408 of causing one or more actions of the routine to be at least temporarily interrupted when a routine state identifier has been modified. The routine state identifier can be modified in response to the database receiving the second routine write request. For example, the one or more actions can include changing the lighting settings within the home (e.g., dimming the lights), therefore in response to routine state identifier being modified, the lighting settings can be reverted back to the lighting settings (e.g., full on) as they were before the receipt of request to perform the routine. Alternatively, the one or more actions can include setting a reminder to put a on a movie, therefore in response to the routine state identifier being modified, the reminder can either not be created, or if it is created, the reminder can be deleted.

Figure 5:
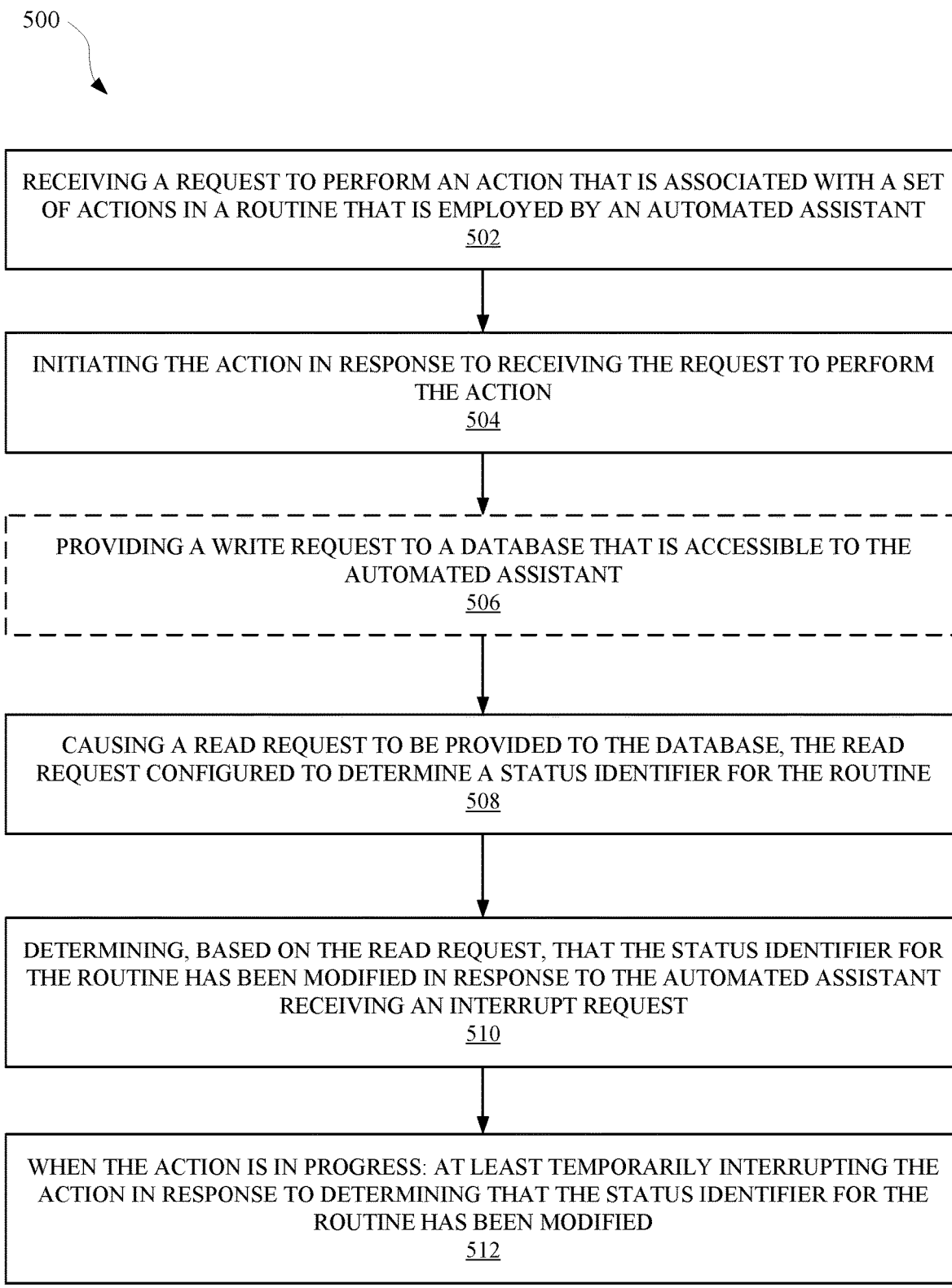
FIG. 5 illustrates a method for interrupting an action executing at a device and/or an application that is performing the action at the direction of an automated assistant.

FIG. 5 illustrates a method 500 for interrupting an action being performed at device or application that is performing the action at the direction of an automated assistant. The method 500 can be performed by one or more applications and/or devices that are capable of performing one or more actions of a routine at the direction of an automated assistant. The method 500 can include an operation 502 of receiving a request to perform an action that is associated with a set of actions in a routine that is employed by an automated assistant. The request can be provided by an automated assistant that has received a command from a user to perform the routine. For example, the automated assistant can receive a spoken command such as, "Assistant, please prepare dinner," at an automated assistant interface of a computing device. In response, the automated assistant can convert the spoken command to text, identify a routine that corresponds to the text, and communicate with any devices and/or applications that are configured to perform actions in furtherance of the identified routine. For example, a device that received the request to perform the action can be associated with an action of ordering a food delivery to the home of the user.

The method 500 can further include an operation 504 of initiating the action in response to receiving the request to perform the action. Initiating the action can include processing data received from the automated assistant and/or the user, communicating with a separate application and/or device, and/or performing any other operation in furtherance of a routine. For instance, when the action corresponds to ordering a food delivery, initiating the action can include accessing an account of the user and providing a variety of food options for the user to select from. Data corresponding to the food options can then be provided to the automated assistant in order that the automated assistant can present the food options to the user to allow the user to select from the food options.

The method 500 can optionally include an operation 506 of providing a write request to the database that is accessible to the automated assistant. The write request can provide an indication to the database that the action is in progress. In this way, the automated assistant and/or any other application and/or device that is associated with the routine can access the database and determine that the requested action is in progress. For instance, in response to receiving a request to initialize a routine, the automated assistant can provide a request to each application and/or device involved in the routine to check the database to determine whether a status or state of the routine has changed. In this way, if a status or state of the routine has changed, each application and/or device involved can modify one or more actions they have been assigned in order to promptly respond to the change to the status or state of the routine.

The method 500 can additionally include an operation 508 of causing a read request to be provided to the database. The read request can be configured to determine a status identifier for the routine. In some implementations, the read request can be provided by an application and/or device that has been tasked with performing an action of the routine. Additionally, the read request(s) can be provided at periodic intervals and/or in response to one or more steps of an action being completed. If a user has provided an interrupt command to the automated assistant interface, the status identifier for the routine can be modified and, therefore, the read request will result in a status identifier such as "stopped" or "paused" being provided.

The method 500 can additionally include an operation 510 of determining, based on the read request that the status identifier for the routine has been modified in response to the automated assistant receiving an interrupt request. For example, the automated assistant can receive an interrupt request such as, "Assistant, please stop." In response to the interrupt request, the automated assistant can cause a state management engine to provide a write request to the database to modify the status of the routine. Thereafter, any application and/or device that has been assigned an action to perform in furtherance of the routine can determine that the status of the routine has been modified and can adjust their performance of the action accordingly. For example, when the status of the routine has been modified to indicate that the routine has been stopped, each application and/or device can stop performance of a corresponding action if the action has not been completed or is in progress.

The method 500 can further include an operation 512 of at least temporarily interrupting the action in response to determining that the status identifier for the routine has been modified. The operation 512 can be performed when the action is in progress. For example, when the action corresponds to ordering food for delivery and the action has not been completed, the application and/or device responsible for the action can cease performance of the action. Specifically, if an account of the user has been accessed for determining food preferences of the user, then some amount of the action has been performed. However, because the status of the routine has been modified, no further steps will be performed in furtherance of the action and the routine, and therefore any food preferences determined can be disregarded. By allowing the user to interrupt the routine, network and computational resources can be preserved, at least because the actions being performed in furtherance of the routine can be stopped at any time. If the automated assistant and/or any other application or device involved in the routine was not able to stop performance of certain actions in furtherance of the routine, the actions would waste resources, especially if the user had no interest in using the results of the actions.

Figure 6:
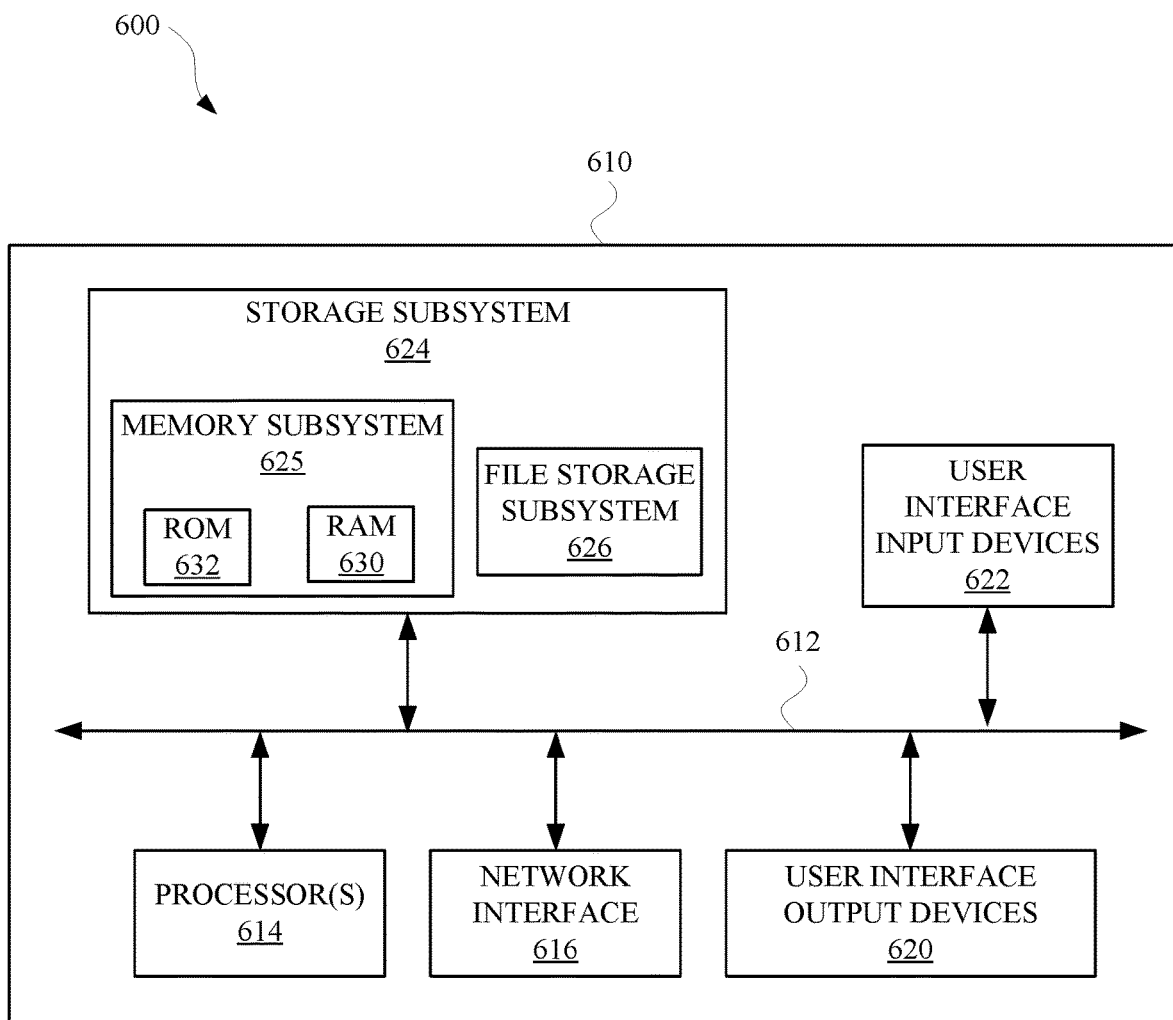
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, method 500, and/or to implement one or more of client device 116, remote device 112, server device 102, computing device 128, remote device 136, computing device 206, computing device 212, computing device 220, computing device 214, and/or any other device or application discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by one or more processors, the method comprising:
   receiving, at an automated assistant interface, a routine command corresponding to a request for an automated assistant application to initiate performance of a routine that includes a set of actions to be performed at the direction of the automated assistant application, wherein the set of actions includes a third party action that is associated with a third party application and one or more automated assistant actions to be performed by the automated assistant application, and wherein the third party application is different from the automated assistant application;
   providing a first routine write request to a database in response to receiving the routine command, wherein the first routine write request is configured to cause a routine state identifier at the database to indicate that the routine is in progress;
   causing the third party application to provide one or more first read requests to the database during performance of the third party action to read the routine state identifier and identify a status of the routine based on the routine state identifier,
      wherein the third party application continues performance of the third party action when the status indicates that the routine is in progress and at least temporarily interrupts performance of the third party action when the status indicates that the routine is temporarily interrupted;
   providing one or more second read requests to the database during performance of the one or more automated assistant actions to read the routine state identifier;
   receiving, at the automated assistant interface, an interrupt request from a user;
   determining that the interrupt request is to interrupt the routine;
   providing a second routine write request to the database in response to receiving the interrupt request from the user, the second routine write request configured to modify the routine state identifier to indicate that the routine is at least temporarily interrupted;
   when one of the one or more second read requests reads that the routine state identifier is modified at the database in response to the database receiving the second routine write request, wherein the routine state identifier identifies the routine is at least temporarily interrupted:
      causing the one or more automated assistant actions of the set of actions of the routine to be at least temporarily interrupted; and
   when the third party action has been completed prior to receiving the interrupt request:
      modifying the routine state identifier to indicate that the third party action is completed.

2. The method of claim 1, wherein providing the second routine write request to the database comprises:
   selecting the routine state identifier from other identifiers stored at the database, the other identifiers corresponding to different routines capable of being performed by the automated assistant application.

3. The method of claim 1, wherein modifying the routine state identifier includes:
   generating a value for the routine state identifier that indicates at least one action of the set of actions has been stopped.

4. The method of claim 1, further comprising:
   providing, to the user, a notification indicating that the routine has been stopped and the third party action has been completed.

5. The method of claim 1, wherein the automated assistant interface is integral to a computing device, and the routine state identifier is stored at the database that is provided at a separate computing device.

6. The method of claim 1, further comprising:
generating contextual data in response to receiving the routine command; and
identifying, in response to receiving the interrupt request, the routine state identifier based on the contextual data.

7. A method implemented by one or more processors, the method comprising:
receiving, from an automated assistant application, a routine write request in response to the automated assistant application receiving an input command from a user, the routine write request identifying a routine that corresponds to a set of actions to be initiated by the automated assistant application in response to receiving the input command, wherein the set of actions includes a third party action that is associated with a third party application and one or more automated assistant actions to be performed by the automated assistant application, and wherein the third party application is different from the automated assistant application;
generating a routine state for the routine in response to receiving the routine write request, wherein the routine state is associated with an identifier for the routine and is configured to be modifiable during the routine;
causing the third party application to provide one or more first read requests during performance of the third party action to read the routine state,
wherein the third party application continues performance of the third party action when the routine state indicates that the routine is in progress and at least temporarily interrupts performance of the third party action when the routine state indicates that the routine is at least temporarily interrupted;
receiving a state read request from the automated assistant application, wherein the state read request is received during performance of the routine and in response to the automated assistant application receiving a routine interrupt request from the user;
identifying, in response to receiving the state read request, the identifier for the routine that is being performed by the automated assistant application;
providing, to the automated assistant application, the identifier for the routine being performed by the automated assistant application;
receiving, from the automated assistant application, a state write request configured to at least temporarily interrupt the routine being performed;
modifying the routine state to at least temporarily interrupted in response to receiving the state write request;
when the third party action has been completed prior to receiving the state write request:
modifying the routine state to indicate that the third party action is completed; and
providing the modified routine state in response to a next routine state request from the automated assistant application,
wherein providing the modified routine state to the automated assistant application causes the one or more automated assistant actions of the routine to be at least temporarily interrupted.

8. The method of claim 7, wherein identifying the identifier for the routine includes:
performing a query to select the identifier from other identifiers stored at a database, the other identifiers corresponding to different routines capable of being performed by the automated assistant application.

9. The method of claim 7, wherein modifying the routine state includes:
generating a value for the routine state that indicates at least one action of the set of actions has been stopped.

10. The method of claim 7, further comprising:
causing the automated assistant application to provide, to the user, a notification indicating that the routine has been stopped and the third party action has been completed.

11. The method of claim 7, wherein the routine interrupt request is received at an automated assistant interface of a computing device, and the routine state is stored at a database that is provided at a separate computing device.

12. The method of claim 7, wherein identifying the identifier for the routine is performed based on contextual data that is available to the automated assistant application.

13. A method implemented by one or more processors, the method comprising:
receiving a request to perform an action that is associated with a set of actions in a routine that is employed by an automated assistant application, wherein the request is received at a computing device in response to an input command being received at an automated assistant interface, wherein the action is a third party action that is associated with a third party application, and wherein the set of actions also include one or more automated assistant actions to be performed by the automated assistant application;
initiating the action in response to receiving the request to perform the action;
providing a write request to a database that is accessible to the automated assistant application and the third party application, wherein the write request is configured to provide an indication to the database that the action is in progress;
causing a read request, originated from the third party application, to be provided to the database during performance of the third party action, the read request configured to determine a status identifier for the routine, wherein the status identifier is configured to be modifiable during the routine;
determining, based on the read request, that the status identifier for the routine has been modified to temporarily interrupted in response to the automated assistant application receiving an interrupt request that interrupts the routine;
when the action has been completed prior to the automated assistant application receiving the interrupt request:
causing, by the third party application, the status identifier to be modified to indicate that the third party action is completed; and
at least temporarily interrupting the action, by the third party application, and the one or more automated assistant actions, by the automated assistant application, in response to determining that the status identifier for the routine has been modified to temporarily interrupted.

14. The method of claim 13, further comprising:
causing the automated assistant application to provide, to a user, a notification indicating that the third party action has been completed.

15. The method of claim 13, wherein causing the read request to be provided to the database includes providing multiple read requests to the database during performance of the action.

16. The method of claim 13, when the action has been completed and the status identifier for the routine indicates that the routine has been reversed:

causing a separate action to be performed to undo the action.

17. The method of claim 13, further comprising:

determining that the status identifier for the routine has been modified to indicate that the routine is to continue; and causing the action to be completed.

\* \* \* \* \*